(12) United States Patent
Lee

(10) Patent No.: US 7,804,286 B2
(45) Date of Patent: Sep. 28, 2010

(54) MULTIPLE OUTPUT AMPLIFIERS AND COMPARATORS

(75) Inventor: Damon Lee, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 310 days.

(21) Appl. No.: 11/850,494

(22) Filed: Sep. 5, 2007

(65) Prior Publication Data

US 2009/0058380 A1    Mar. 5, 2009

(51) Int. Cl.
*G05F 3/16* (2006.01)
*H03F 3/45* (2006.01)

(52) U.S. Cl. .................. 323/316; 323/314; 330/257; 330/288

(58) Field of Classification Search .......... 330/200, 330/252, 253, 254, 257, 259, 260, 288, 310; 363/313, 314, 315, 316
See application file for complete search history.

(56) References Cited

U.S. PATENT DOCUMENTS

| | | | | |
|---|---|---|---|---|
| 6,486,736 B2 * | 11/2002 | Cusinato et al. | ............. | 330/255 |
| 6,566,951 B1 * | 5/2003 | Merrigan et al. | ............ | 330/254 |
| 7,053,711 B2 * | 5/2006 | Bogner | ....................... | 330/253 |
| 7,253,686 B2 * | 8/2007 | Ali | ............................. | 330/259 |
| 7,489,186 B2 * | 2/2009 | Segarra | ......................... | 330/2 |

* cited by examiner

*Primary Examiner*—Gary L Laxton
(74) *Attorney, Agent, or Firm*—McDermott Will & Emery LLP

(57) ABSTRACT

An amplifier/comparator includes a multitude of output stages all sharing the same input stage. One or more of the output stages are amplification stages and have compensated output signals. A number of other output stages are not compensated and provide comparison signals. Each uncompensated output stage is adapted to switch to a first state if it detects a first input signal as being greater than a second signal, and further to switch to a second state if it detects the first input signal as being smaller than the second signal. By varying the channel-width (W) to channel-length (L) ratio (W/L) of the transistors disposed in the output stages, the trip points of the comparators and/or the electrical characteristics of the amplifiers are selectively varied.

20 Claims, 6 Drawing Sheets

MULTIPLE OUTPUT AMPLIFIERS AND COMPARATORS

BACKGROUND OF THE INVENTION

The present invention relates to integrated circuits, and more particularly to switching voltage regulators formed in an integrated circuit.

Voltage regulators are often used to generate a lower DC voltage from a higher, unstable DC supply voltage. One type of voltage regulator, commonly referred to as a switching voltage regulator, typically includes a switching element, such as a transistor, and an inductor disposed between the voltage source and an output load. The switching regulator regulates the voltage across the load by turning the switching element on and off, thereby enabling current pulses to be delivered from the voltage source to the inductor. The inductor together with a capacitor convert the current pulses to a substantially constant load current so as to regulate the load voltage.

FIG. 1 is a schematic diagram of a current-mode step-down switching regulator 100, as known in the prior art. To increase the output voltage $V_{OUT}$, current is supplied to inductor 118 by closing switch 128 and opening switch 126. To decrease the output voltage $V_{OUT}$, current is withdrawn from inductor 118 by closing switch 126 and opening switch 128. Switches 126 and 128 are opened and closed in response to control signals C1 and C2 generated by control logic 110.

Feedback voltage $V_{FB}$ generated using resistors 122 and 124 is fed back to the negative input terminal of amplifier 102. Amplifier 102 may be a transconductance amplifier and is alternatively referred to below as an error amplifier. Amplifier 102 is adapted to generate a signal $VI_{TH}$ that is proportional to a difference between voltage $V_{FB}$ and a reference $V_{Ref}$. Reference voltage $V_{Ref}$ may be supplied by a bandgap circuit and is adapted so as not to vary substantially with supply voltage, temperature, etc. Compensation circuit 142 is coupled to the output terminal of amplifier 102 when switch 140—shown as being responsive to signal Sleep—is closed. Compensation circuit 142 stabilizes amplifier 102 against a number of factors, such as supply voltage variations, temperature changes, etc, as is well known in the art.

Hysteretic comparator 104 is adapted to compare signal $VI_{TH}$ with reference voltage $V_{B1}$. If voltage $VI_{TH}$ is detected as being higher than an upper level of a voltage band defined by reference voltage $V_{B1}$, output voltage Sleep of comparator 104 switches to a high state. If, on the other hand, voltage $VI_{TH}$ is detected as being smaller than a lower level of the voltage band defined by reference voltage $V_{B1}$, output voltage Sleep of comparator 104 switches to a low level. When signal Sleep is asserted, e.g., is at a high level, compensation circuit 142 is decoupled from amplifier 102, voltage limiter 106 is shut down, signal $C_1$ causes switch 128 to go into a high-impedance mode, and signal $C_2$ causes switch 126 to go into high-impedance mode when the switch current approaches zero, thus placing voltage regulator 100 in a standby mode so as to reduce the quiescent current. When output voltage $V_{OUT}$ starts to fall below a certain value, comparator 104 switches again, thereby causing signal Sleep to be de-asserted to resume normal operation.

Voltage limiter 106 compares voltage signal $VI_{TH}$ with another reference voltage $V_{B2}$. If voltage signal $VI_{TH}$ is detected as being greater than voltage level $V_{B2}$, voltage limiter 106 delivers output voltage signal $VI_{TH}$ at its output terminal unchanged. If signal $VI_{TH}$ is detected as being smaller than voltage level $V_{B2}$, voltage limiter 106 clamps signal $VI_{TH}$ to voltage level $V_{B2}$ and delivers the voltage level $V_{B2}$ at its output terminal. In other words, voltage limiter 106 ensures that its output voltage $V_{clamp}$ does not fall below voltage level $V_{B2}$.

Current $I_1$ causes a voltage $V_1$ to develop across resistor 116 disposed across the input terminals of comparator 108. Voltage $V_{clamp}$ varies the trip point of comparator 108. If voltage $V_1$ is detected as being smaller than voltage $V_{clamp}$, output signal B of comparator 108 is maintained at a first state, e.g. a low logic state. Conversely if voltage $V_1$ is detected as being greater than voltage $V_{clamp}$, output signal B of comparator 108 is maintained at a second logic state, e.g. a high logic state.

Control logic 110 receives signals Sleep and B, and in response generates control signals $C_1$ and $C_2$. If signal B is at, e.g., a low logic level, signals $C_1$ and $C_2$ are respectively caused to be at high and low levels, thereby causing switch 128 to be on and switch 126 to off. In other words, if voltage $V_1$ is detected as being smaller than voltage $V_{clamp}$, switch 128 is turned on and switch 126 is turned off. Accordingly, current $I_1$ is enabled to flow to inductor 118 and resistor 122 to thereby raise output voltage $V_{out}$.

Conversely, if signal B is at, e.g., a high logic level, signals $C_1$ and $C_2$ are respectively caused to be at low and high levels, thereby causing switch 128 to turn off and switch 126 to turn on. In other words, if voltage $V_1$ is detected as being greater than voltage $V_{clamp}$, switch 128 is turned off and switch 126 is turned on. Accordingly, current $I_2$ is withdrawn from inductor 118 and resistor 122 to thereby decrease output voltage $V_{out}$.

Switch regulator 110 is also shown as including comparators 112 and 114, as well oscillator 130. Comparator 112 is adapted to assert its output signal $V_{under}$ if comparator 112 detects that feedback voltage $V_{FB}$ is smaller than voltage $V_{ref}-\Delta V$. Comparator 114 is adapted to assert its output signal $V_{over}$ if comparator 114 detects that feedback voltage $V_{FB}$ is greater than voltage $V_{ref}+\Delta V$, where $\Delta V$ is a predefined voltage level. Oscillator 130 supplies a clock signal to control logic 110.

The amount of ripple appearing at output voltage $V_{OUT}$ is determined, in part, by the difference between the trip points of comparator 104 divided by the gain of amplifier 102. Therefore, to decrease such ripples, the difference between the trip points of comparator 104 is required to be reduced and/or the gain of amplifier 102 is required to increase. As is well known, the gain of amplifier 102 is dependent, in part, on the electrical characteristics of the components disposed in compensation block 142. While compensation circuit 142 stabilizes amplifier 102 it also loads the negative input terminal of comparator 104. This loading causes comparator 104 to be relatively slow and unable to follow the variation in output signal $V_{OUT}$, in turn, causing ripples to appear on signal $V_{OUT}$.

To reduce the output voltage ripple, amplifier 102 and comparator 104 may be coupled in parallel, as shown in switching voltage regulator 200, displayed in FIG. 2. Because in embodiment 200, comparator 104 is not loaded with the compensation circuit 142, output ripple voltage is reduced. However, the difference between the offset voltages of amplifier 102 and comparator 104 causes a number of disadvantages. It would thus be desirable to have a switching voltage regulator that has a reduced output ripple voltage and that overcomes the problems described above.

BRIEF SUMMARY OF THE INVENTION

In accordance with one embodiment of the present invention, an amplifier/comparator includes a multitude of output stages all sharing the same input stage. One or more of the output stages are compensated to provide stability for their respective output signals; accordingly, each such output stage is an amplifier output stage. The remaining output stages are not compensated. Each uncompensated output stage is adapted to switch to a first state if it detects a first input signal as being greater than a second signal, and further to switch to a second state if it detects the first input signal as being smaller than the second signal; accordingly, each such output stage is a comparator output stage.

By varying the channel-width (W) to channel-length (L) ratio (W/L) of the transistors disposed in a comparator output stage relative to the W/L of associated transistors disposed in an intermediate stage, the trip point of the comparator is selectively varied. Similarly, by varying (W/L) of the transistors disposed in an amplifier output stage relative to the W/L of associated transistors disposed in the intermediate stage, the electrical characteristics, e.g., gain of the amplifier is selectively varied.

In some embodiments, the multi-output amplifier/comparator is disposed in a current-mode switching regulator adapted to generate a lower DC voltage from a higher unstable DC power supply.

DETAILED DESCRIPTION OF THE INVENTION

In accordance with one embodiment of the present invention, an amplifier/comparator includes a multitude of output stages all sharing the same input stage. A number of output stages are amplification stages and are compensated to provide stability for their respective output signals. A number of output stages are not compensated. Each uncompensated output stage is adapted to switch to a first state if it detects a first input signal as being greater than a second signal, and further to switch to a second state if it detects the first input signal as being smaller than the second signal. Accordingly each uncompensated output stage is a comparator stage.

Figure 1:
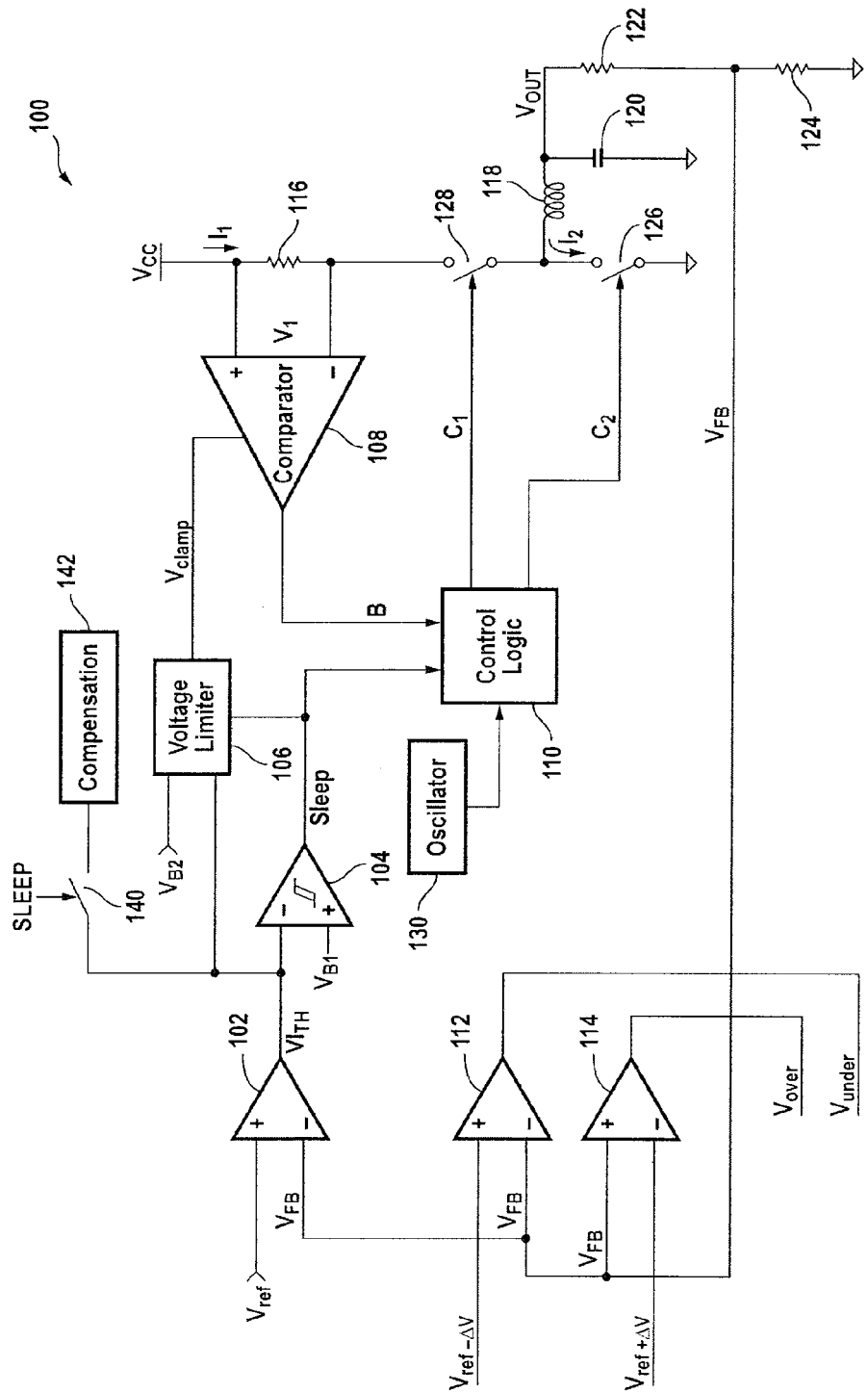
FIG. 1 is a schematic diagram of a current-mode switching regulator, as known in the prior art.
Figure 2:
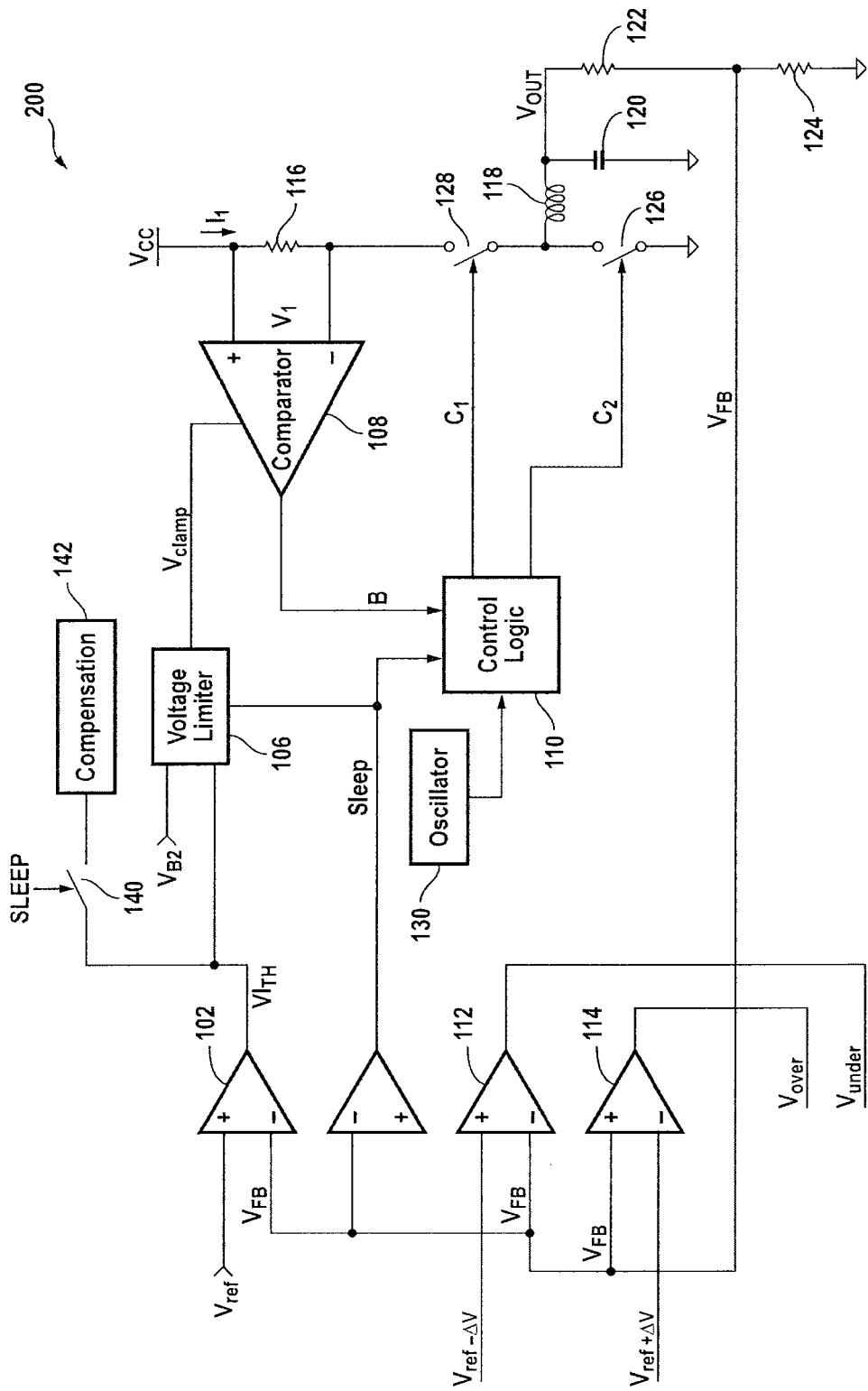
FIG. 2 is a schematic diagram of a current-mode switching regulator, as known in the prior art.
Figure 3:
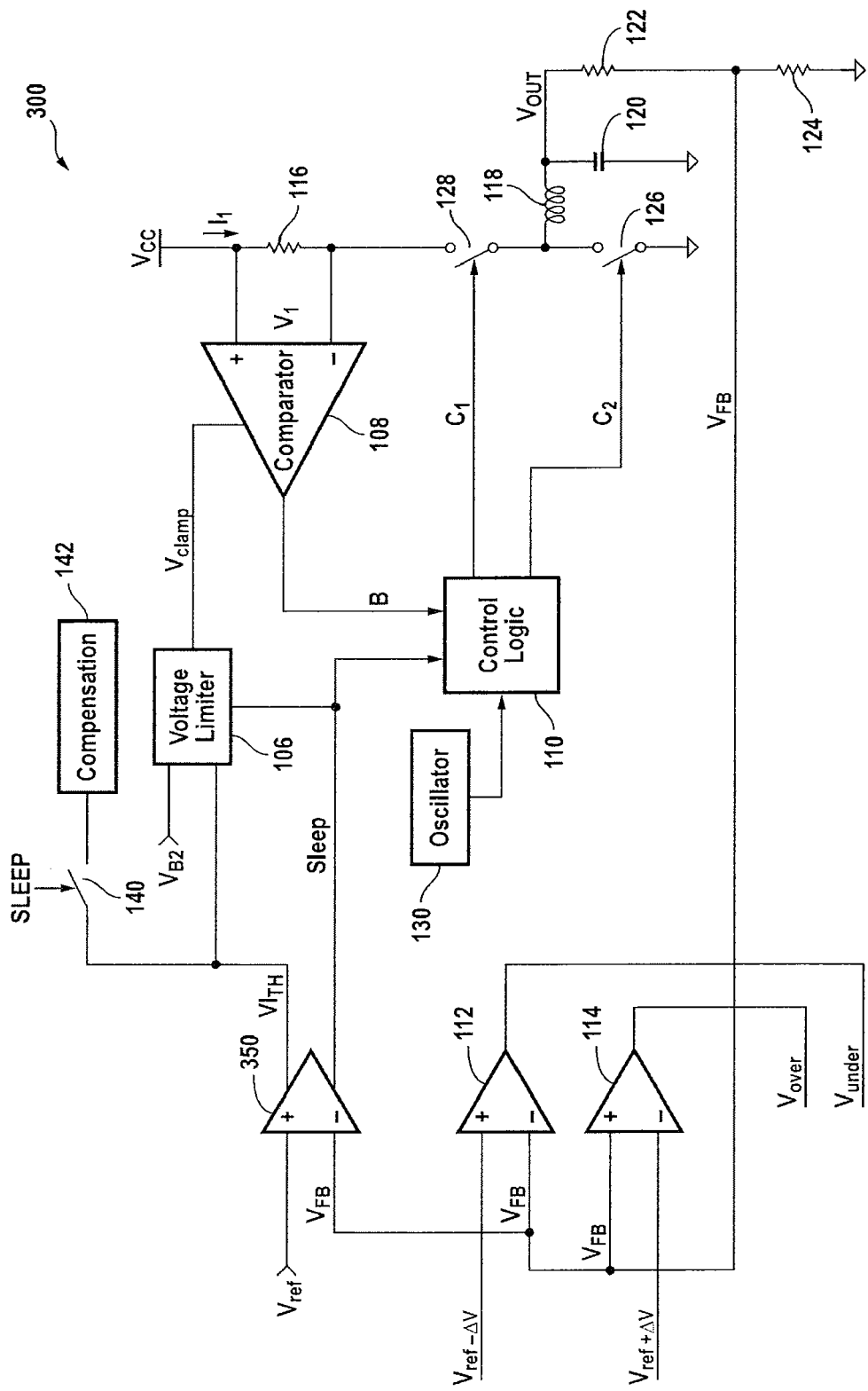
FIG. 3 is a schematic diagram of a current-mode switching regulator, in accordance with one embodiment of the present invention.

FIG. 3 is a schematic diagram of a switching regulator 300, in accordance with one exemplary embodiment of the present invention. Switching regulator 300 is shown as including, in part, a dual-output amplifier/comparator 350. Switching regulator 300 is also shown as including, in part, compensation block 142, voltage limiter 106, comparators 108, 112, 114, control logic 110, resistor 116, switches 126, 128, inductor 118, capacitor 120, resistive load 122 and oscillator 130; these blocks are similar to those described with reference to FIG. 1 and thus are not described further.

As described furtherbelow, amplifier/comparator 350 includes a stage(s) that performs amplification as well as a stage(s) that performs comparison operations. For simplicity, amplifier/comparator 350 is alternatively referred to hereinbelow as amplifier 350. Amplifier 350 generates a pair of output voltage signals $VI_{TH}$ and Sleep in response to the feedback voltage $V_{FB}$ as well as reference voltage $V_{Ref}$. Output signal $VI_{TH}$ is applied to compensation block 142 via switch 140. Output signal Sleep is applied to voltage limiter 106 as well as to control logic 110. When signal Sleep is asserted, compensation circuit 142 is decoupled from amplifier 350, voltage limiter 106 is shut down, signal $C_1$ causes switch 128 to go into a high-impedance state, and signal C causes switch 126 to go into a high-impedance state when the current in switch 126 (and thus inductor 118) is close to zero. The voltage regulator 300 is then placed in a standby mode so as to reduce the quiescent current. When output voltage $V_{OUT}$ starts to fall below a certain value, amplifier 350 switches again, thereby causing signal Sleep to be de-asserted to resume normal operation.

Figure 4:
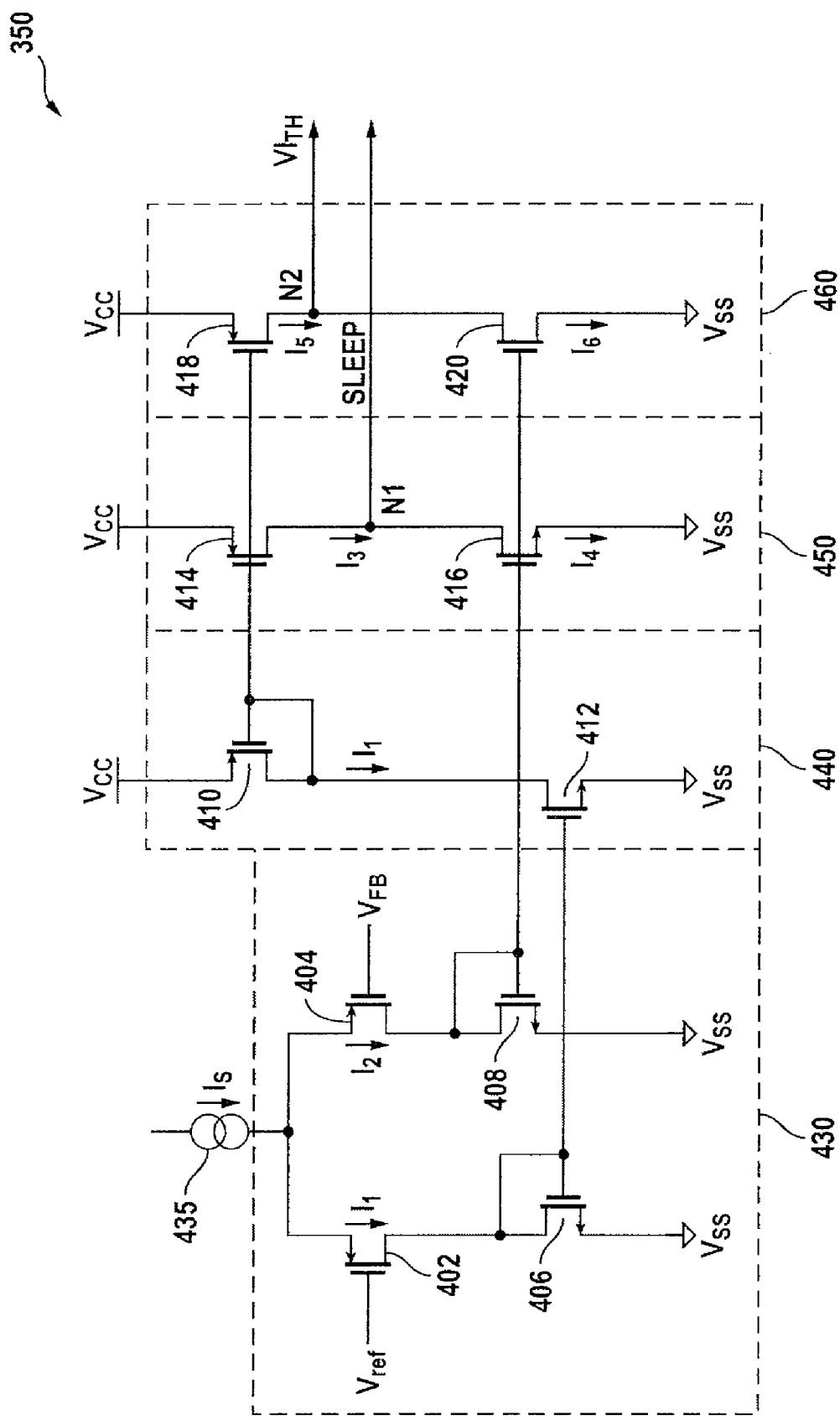
FIG. 4 is a transistor schematic diagram of the error amplifier and the burst comparator disposed in the switching regulator of FIG. 3, in accordance with one exemplary embodiment of the present invention.

FIG. 4 is a transistor schematic diagram of amplifier 350, in accordance with one exemplary embodiment of the present invention. Amplifier 350 is shown as including a differential input stage 430, intermediate stage 440, and a pair of output stages 450 and 460. Output stage 460 generates output signal $VI_{TH}$ that is compensated by compensation block 142 shown in FIG. 3. Therefore output signal $VI_{TH}$ is a compensated and stable amplified output signal responsive to a difference of input signals $V_{FB}$ and $V_{Ref}$. Output stage 450 generates output signal Sleep that is not compensated and is adapted to switch to a first state when signal $V_{FB}$ is greater than signal $V_{Ref}$ and to switch to a second state when signal $V_{FB}$ is smaller than signal $V_{Ref}$. Therefore output signal Sleep is an uncompensated comparison signal, representative of a difference between signals $V_{Ref}$ and $V_{FB}$.

As is seen from FIG. 4, both output stages 450 and 460 share the same input stage 430, in accordance with the present invention. Accordingly, relatively small amount of input offset exists between the amplifier—defined, in part, by input stage 430 and output stage 460—and the comparator defined, in part, by input stage 430 and output stage 450. Furthermore, because the input stage 430 of the comparator is not loaded by the compensation block 142, in accordance with the present invention, the comparator operates at a high speed thus minimizing output ripple voltage.

Currents $I_1$ and $I_2$ respectively flowing through transistors 402 and 404 are varied in response to input signals $V_{FB}$ and $V_{Ref}$ applied respectively to the gate terminals of transistors 402 and 404. Transistors 406 and 408 are active load transistors that are also respectively adapted to pass currents $I_1$ and $I_2$. Current $I_s$ supplied by current source 435 is equal to the sum of currents $I_1$ and $I_2$ and is used to bias differential input stage 430. Since transistors 406 and 412 have the same gate-to-source voltage, current $I_1$ also flows through transistor 412. Transistors 410 and 412 have the same drain current, therefore current $I_1$ also flows through transistor 410.

Transistor 414 is selected to have a channel-width (W) to channel length (L) ratio that is M times the W/L of transistor 410, where M is greater than zero. Because transistors 414 and 410 have the same gate-to-source voltage, current $I_3$ flowing through transistor 414 is equal to $M \times I_1$. Transistor 416 is selected to have a W/L ratio that is N times the W/L of transistor 408, where N is greater than zero. Because transistors 408 and 416 have the same gate-to-source voltage, current $I_4$ flowing through transistor 416 is equal to $N \times I_1$. By properly selecting parameters M and N to set currents $I_3$ and $I_4$, the trip point of the comparator defined by output stage 450 is selectively varied. This trip point is dependent, in part, on the difference between currents $I_3$ and $I_4$.

Transistor 418 is selected to have a W/L ratio that is P times the W/L of transistor 410, where P is greater than zero. Because transistors 418 and 410 have the same gate-to-source voltage, current $I_5$ flowing through transistor 418 is equal to $P \times I_1$. Transistor 420 is selected to have a W/L ratio that is Q times the W/L of transistor 408, where Q is greater than zero. Because transistors 420 and 408 have the same gate-to-source voltage, current $I_6$ flowing through transistor 420 is equal to $Q \times I_1$. By properly selecting parameters P and Q to set currents $I_5$ and $I_6$, the output characteristic, e.g., gain, offset, of the amplifier defined by output stage 460 is selectively varied.

Figure 5:
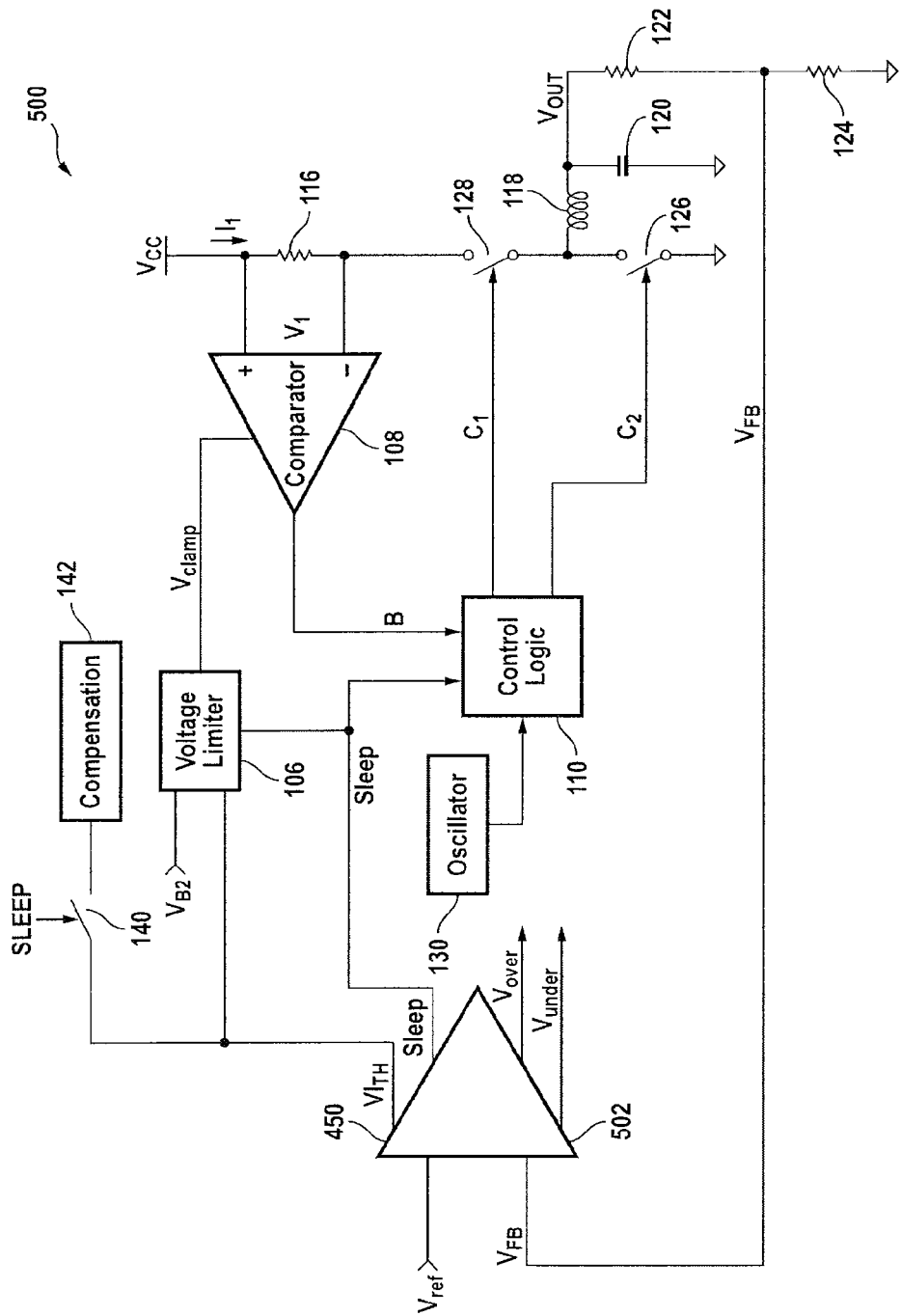
FIG. 5 is a schematic diagram of a current-mode switching regulator, in accordance with one exemplary embodiment of the present invention.

FIG. 5 is a schematic diagram of a switching regulator 500, in accordance with another exemplary embodiment of the present invention. Switching regulator 500 is similar to switching regulator 300 except that multi-output amplifier 450 disposed in switching regulator 500, in addition to delivering amplified signal $VI_{TH}$ and comparison signal Sleep, also delivers additional compare signals $V_{over}$, and $V_{under}$ each generated in accordance with a different trip point. In other words, multi-output amplifier 450 performs the various functions associated with amplifier 102, and comparators 104, 112 and 114 of switching regulator 100, shown in FIG. 1.

Figure 6:
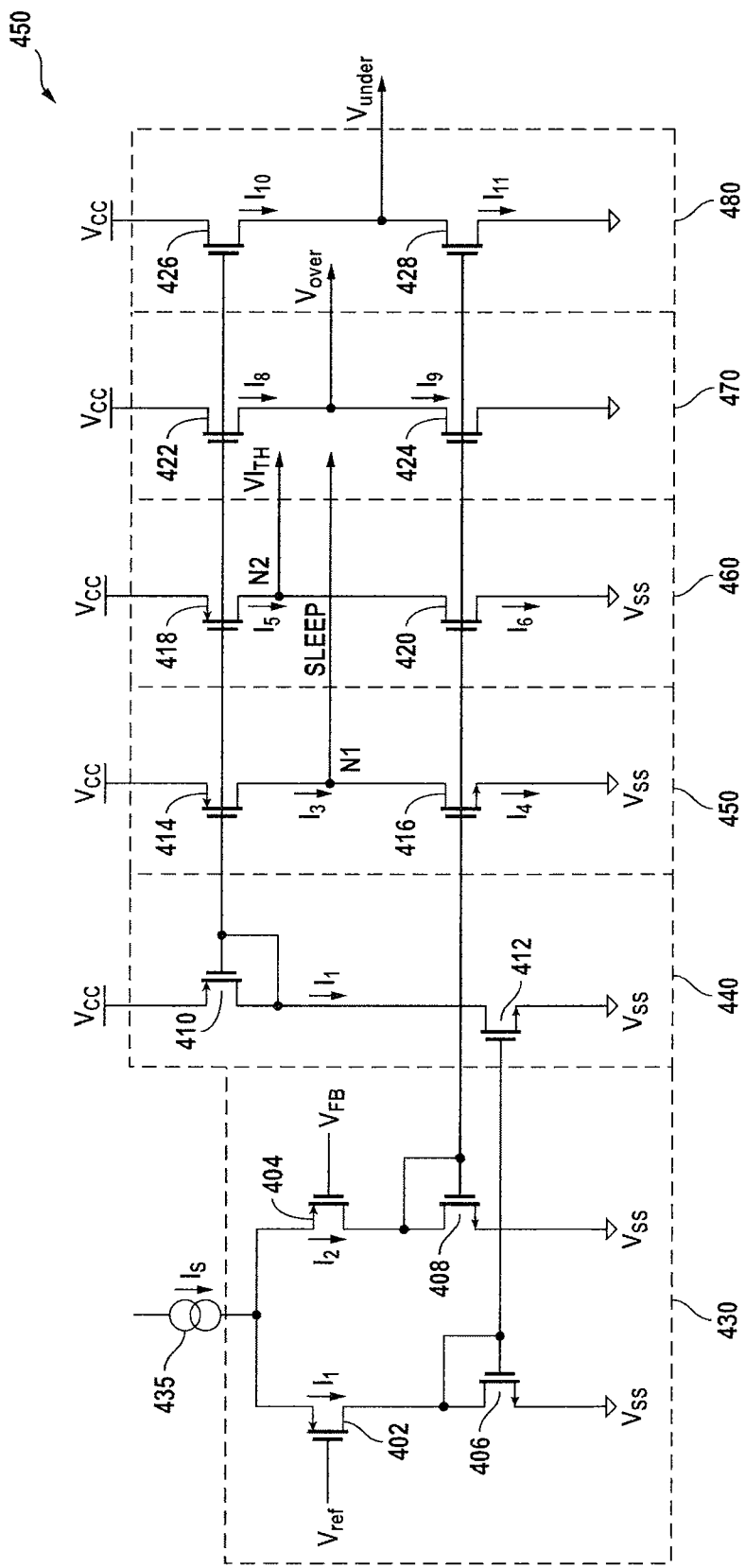
FIG. 6 is a transistor schematic diagram of a multi-output amplifier/comparator, in accordance with one exemplary embodiment of the present invention.

FIG. 6 is a transistor schematic diagram of amplifier 450 disposed in switching regulator 500, in accordance with one exemplary embodiment of the present invention. Amplifier 450 is shown as including an input stage 430, an intermediate stage 440, and four output stages 450, 460, 470 and 480. Output stages 450 and 460 respectively generate output signals Sleep and $VI_{TH}$, as described above. Input stage 430 and output stage 470 together define comparator 114. Likewise, input stage 430 and output stage 480 together define comparator 112. The W/L of transistors 422 and 424 are selected so that the difference between currents $I_8$ and $I_9$ relative to the difference between currents $I_3$ and $I_4$ causes the trip point of output stage 470 to be higher than the trip point of output stage 460 by a predefined value $\Delta V$. Likewise, the W/L of transistors 426 and 428 are selected so that the difference between currents $I_{10}$ and $I_{11}$ relative to the difference between currents $I_3$ and $I_4$ causes the trip point of output stage 480 to be smaller than the trip point of output stage 460 by $\Delta V$.

The above embodiments of the present invention are illustrative and not limitative. Various alternatives and equivalents are possible. The invention is not limited by the type of transistors, bipolar, MOS or otherwise, that may be used to form the amplifiers, comparators, etc. Nor is the invention limited by the type of circuit, switching regulator or otherwise, in which the multi-output amplifier of the present invention may be embodied. The invention is not limited by the type of integrated circuit in which the present disclosure may be disposed. Nor is the invention limited to any specific type of process technology, e.g., CMOS, Bipolar, BICMOS, or otherwise that may be used to form the differential amplifier of the present invention. Other additions, subtractions or modifications are obvious in view of the present invention and are intended to fall within the scope of the appended claims.

What is claimed is:

1. A circuit comprising:
   a differential input stage responsive to a reference voltage and a feedback voltage for producing an output current representing a difference between the feedback voltage and the reference voltage;
   an intermediate stage adapted to mirror the output current to produce a first mirrored current and a second mirrored current;
   a first output stage responsive to the first mirrored current to generate a first output signal; and
   a second output stage responsive to the second mirrored current to generate a second output signal independent from the first output signal.

2. The circuit of claim 1 further comprising:
   a compensation block responsive to the second output stage.

3. The circuit of claim 2 wherein said first output stage further comprises first and second transistors, said first transistor adapted to flow a current M times the first mirrored current, and said second transistor adapted to flow a current N times a second current flowing through the differential input stage, wherein M and N are greater than zero.

4. The circuit of claim 3 wherein said second output stage further comprises third and fourth transistors, said third transistor adapted to flow a current P times the first mirrored current, and said fourth transistor adapted to flow a current Q times the second current, wherein P and Q are greater than zero.

5. The circuit of claim 4 wherein the first output signal is at a first logic state when the second output signal is greater than a second reference voltage, and wherein the first output signal is at a second logic state when the second output signal is smaller than the second reference voltage.

6. The circuit of claim 5 further comprising:
   a third output stage responsive to the differential input stage and the intermediate stage to generate a third output signal.

7. The circuit of claim 5 further comprising:
   a switch adapted to decouple the compensation circuit from the second output stage in response to the first output signal.

8. The circuit of claim 7 further comprising:
   a clamping circuit responsive to the first and second output signals to generate a clamped voltage having a minimum value defined by a third reference voltage.

9. The circuit of claim 8 further comprising:
   a comparator adapted to cause a current flowing through an inductor to increase if a voltage across a resistor is detected as being smaller than the clamped voltage, and to cause the current flowing through the inductor to decrease if the voltage across the resistor is detected as being greater than the clamped voltage, the current flowing through the inductor defining the feedback voltage.

10. The circuit of claim 9 wherein said circuit is disposed in a switching voltage regulator.

11. A method of controlling an output voltage, the method comprising:
    forming a differential input stage responsive to a reference voltage and a feedback voltage for producing an output current representing a difference between the feedback voltage and the reference voltage;
    mirroring the output current to produce a first mirrored current and a second mirrored current;
    generating a first output signal in response to the first mirrored current; and
    generating a second output signal independent from the first output signal in response to the second mirrored current.

12. The method of claim 11 further comprising:
    compensating the second output signal.

13. The method of claim 12 further comprising:
flowing a third current M times the first mirrored current; and
flowing a fourth current N times a second current flowing through the differential input stage, wherein M and N are greater than zero.

14. The method of claim 13 further comprising:
flowing a fifth current P times the first mirrored current; and
flowing a sixth current Q times the second current, wherein P and Q are greater than zero.

15. The method of claim 14 further comprising:
setting the first output signal to a first logic state if the second output signal is detected as being greater than a second reference voltage; and
setting the first output signal to a second logic state if the second output signal is detected as being smaller than the second reference voltage.

16. The method of claim 15 further comprising:
generating a third output signal in response to the first mirrored current and the second current.

17. The method of claim 15 further comprising:
inhibiting the compensation of the second output stage in response to the first output signal.

18. The method of claim 17 further comprising:
clamping the second output signal to a value defined by a third reference voltage and in response to the first output signal.

19. The method of claim 18 further comprising:
increasing a seventh current flowing through a resistor if a voltage across the resistor is detected as being smaller than the clamped second output signal;
decreasing the seventh current if the voltage across the resistor is detected as being greater than the clamped second output signal; and
establishing the feedback voltage in accordance with the seventh current.

20. The method of claim 19 further comprising:
switching an output signal in accordance with the feedback voltage.

* * * * *